(12) United States Patent
Abou Mahmoud et al.

(10) Patent No.: US 9,917,807 B2
(45) Date of Patent: *Mar. 13, 2018

(54) INTELLIGENTLY SHARING MESSAGES ACROSS GROUPS

(71) Applicant: International Business Machines Corporation, Armonk, NY (US)

(72) Inventors: Alaa Abou Mahmoud, Dracut, MA (US); Paul R. Bastide, Boxford, MA (US); Fang Lu, Billerica, MA (US)

(73) Assignee: International Business Machines Corporation, Armonk, NY (US)

( * ) Notice: Subject to any disclaimer, the term of this patent is extended or adjusted under 35 U.S.C. 154(b) by 215 days.

This patent is subject to a terminal disclaimer.

(21) Appl. No.: 14/695,104

(22) Filed: Apr. 24, 2015

(65) Prior Publication Data
US 2016/0127303 A1 May 5, 2016

Related U.S. Application Data

(63) Continuation of application No. 14/533,723, filed on Nov. 5, 2014, now Pat. No. 9,742,720.

(51) Int. Cl.
 *G06F 3/0484* (2013.01)
 *H04L 12/58* (2006.01)

(52) U.S. Cl.
 CPC .......... *H04L 51/32* (2013.01); *G06F 3/04842* (2013.01); *H04L 51/16* (2013.01)

(58) Field of Classification Search
 CPC ................................... G06F 3/04842
 USPC .......................................... 715/752
 See application file for complete search history.

(56) References Cited

U.S. PATENT DOCUMENTS

| | | | |
|---|---|---|---|
| 5,861,886 A | 1/1999 | Moran et al. | |
| 6,003,034 A | 12/1999 | Tuli | |
| 6,437,806 B1 * | 8/2002 | Iwasa | G06Q 10/107 715/744 |
| 8,140,097 B2 | 3/2012 | Silk | |
| 8,200,763 B2 | 6/2012 | Quoc et al. | |
| 8,417,706 B2 | 4/2013 | Berger | |
| 8,442,576 B2 | 5/2013 | Park et al. | |
| 8,743,151 B1 | 6/2014 | Fulcher et al. | |
| 8,930,826 B2 | 1/2015 | Lu et al. | |
| 9,438,548 B2 | 9/2016 | Hamlin et al. | |

(Continued)

OTHER PUBLICATIONS

Office Action dated Nov. 17, 2016 received in parent U.S. Appl. No. 14/533,723, 26 pages.

(Continued)

*Primary Examiner* — Reza Nabi
*Assistant Examiner* — Daniel Rodriguez
(74) *Attorney, Agent, or Firm* — Scully, Scott, Murphy & Presser, P.C.; Jeffrey Kelly, Esq.

(57) ABSTRACT

Identifying recipients to receive communication based on content selection may be provided. An indication of content selected by a user is received. The content may be part of group communication that is communicated among users via an online communication application. The content and an author of the content are identified. One or more criteria may be applied to the content to determine the recipients of the communication. The communication may be transmitted as a single message to the recipients simultaneously.

8 Claims, 3 Drawing Sheets

(56) References Cited

U.S. PATENT DOCUMENTS

| | | | |
|---|---|---|---|
| 2002/0175939 A1* | 11/2002 | Iwasa | H04L 51/14 715/752 |
| 2003/0043201 A1 | 3/2003 | Abdelhadi et al. | |
| 2005/0010645 A1 | 1/2005 | Arshi et al. | |
| 2005/0198143 A1* | 9/2005 | Moody | G06Q 10/107 709/206 |
| 2006/0048069 A1 | 3/2006 | Igeta | |
| 2008/0016467 A1 | 1/2008 | Chambers et al. | |
| 2008/0295000 A1 | 11/2008 | Kieselbach et al. | |
| 2009/0144377 A1 | 6/2009 | Kim et al. | |
| 2009/0234876 A1 | 9/2009 | Schigel et al. | |
| 2010/0083149 A1 | 4/2010 | McCaffrey et al. | |
| 2010/0299201 A1 | 11/2010 | Thrasher | |
| 2011/0151890 A1 | 6/2011 | Platt et al. | |
| 2011/0197146 A1 | 8/2011 | Goto et al. | |
| 2011/0307302 A1 | 12/2011 | Perna | |
| 2012/0192085 A1* | 7/2012 | Lu | H04L 51/14 715/752 |
| 2012/0323928 A1 | 12/2012 | Bhatia | |
| 2013/0031172 A1 | 1/2013 | Olsen et al. | |
| 2013/0054714 A1 | 2/2013 | Bedi | |
| 2013/0097526 A1 | 4/2013 | Stovicek et al. | |
| 2013/0191759 A1 | 7/2013 | Bhogal et al. | |
| 2013/0227409 A1 | 8/2013 | Das et al. | |
| 2013/0232200 A1 | 9/2013 | Knapp | |
| 2013/0339358 A1 | 12/2013 | Huibers et al. | |
| 2014/0089819 A1 | 3/2014 | Andler et al. | |
| 2014/0092126 A1 | 4/2014 | McCulloch McKenzie et al. | |
| 2015/0253968 A1* | 9/2015 | Joo | G06F 3/04842 715/798 |
| 2016/0065520 A1 | 3/2016 | Puranik et al. | |
| 2016/0149838 A1 | 5/2016 | Jeong et al. | |

OTHER PUBLICATIONS

Lavrusik, V., et al., "Improving Conversations on Facebook with Replies", Mar. 25, 2013, 8 pages, https://www.facebook.com/notes/facebook-journalists/improving-conversations-on-facebook-with-replies/578890718789613.

Smith, J., et al., "LanguageWarer™: what is your data trying to tell you?", jStart infocenters, printed on Oct. 27, 2014, 2 pages, http://www-01.ibm.com/software/ebusiness/jstart/textanalytics/infocenter.html.

List of IBM Patents or Patent Applications Treated as Related, dated Apr. 24, 2015, 2 pages.

Notice of Allowance dated Apr. 20, 2017 received in parent U.S. Appl. No. 14/533,723, 18 pages.

* cited by examiner

INTELLIGENTLY SHARING MESSAGES ACROSS GROUPS

FIELD

The present application relates generally to computers and computer applications, and more particularly to intelligently sharing messages across groups, for example, in social networking environment.

BACKGROUND

Social networking applications or websites allow users to communicate with one another, for example, using microblogging or the like features. Such microblogging has become a popular means for communicating, especially in view of the proliferation of the online social networking usage over the Internet. However, things can easily get out of control when many people post message on another person's online social networking wall. For example, a person just bought a new house and had her own birthday. Other people start posting messages such as "Congratulations!" and "Happy birthday" on her wall. In turn, the person responds to everyone, e.g., with a "Thank you!" individually. Such individual responses invariably result in some redundancy in the gesture of the person.

BRIEF SUMMARY

A method and system of identifying recipients to receive communication based on content selection may be provided. The method in one aspect may comprise receiving an indication of content selected by a user. The content may be part of group communication that is communicated among users via an online communication application. The method may also comprise identifying the content and an author of the content. The method may also comprise applying one or more criteria to the content to determine the recipients of the communication. The method may further comprise transmitting the communication as a single message to the recipients simultaneously.

A system of method of identifying recipients to receive communication based on content selection, in one aspect, may comprise a user interface module operable to run on a processor and further operable to receive an indication of content selected by a user, the content being part of group communication that is communicated among users via an online communication application. A processor may be operable to identify the content and an author of the content. The processor may be further operable to apply one or more criteria to the content to determine the recipients of the communication. The processor may be further operable to transmit the communication as a single message to the recipients simultaneously.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
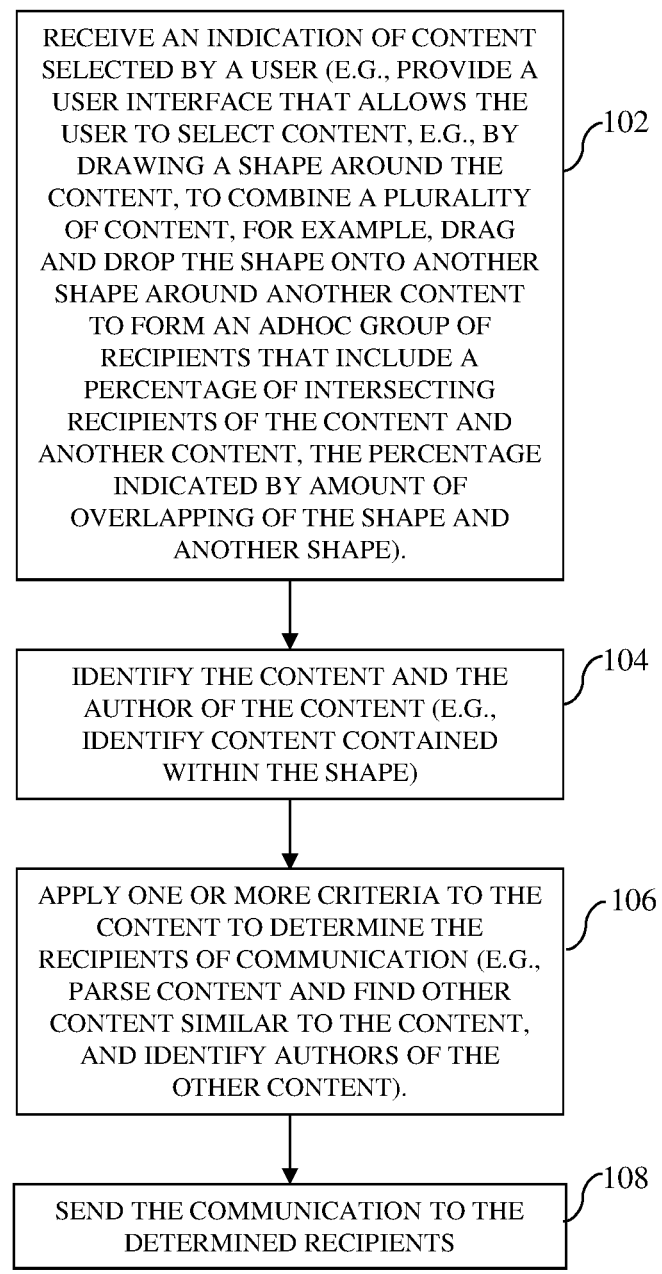
FIG. 1 is a flow diagram illustrating a method of the present disclosure in one embodiment.

In one embodiment, a method may be presented that can manage adhoc groups, for example, by selecting a first and second collaboration artifact, retrieving the authors of each artifact (owners, editors, etc.), analyze the lists of authors to create an adhoc group, and using the adhoc group to initiate or participate in conversations. The collaboration artifacts can be threaded.

The selection may be done through explicit actions such as drag-and-drop, mouse clicks, and/or other input gestures. The selection may involve more than two artifacts. The analysis may use conjunctions and disjunctions to create the adhoc group. The adhoc group, when used, may pre-populate new conversations with the collaboration artifacts. The length of the adhoc group's life span may be determined by one or more of: fixed time window, e.g., 1 hr, 1 day; determined based on author attributes, e.g., User A is a heavy participant in an activity stream, so the adhoc group should have a longer life (The inverse could also be true, e.g., User A seldom participates in the activity stream, so the adhoc group should have a relatively short life); User/administrator/system settings; Any combination of the life spans. The length of the life span may be increased or decreased.

The length of the adhoc group can be tuned based on feedback. The adhoc group may have an avatar, a graphical image representing a person. The avatar may be a group picture of all the participants in that group. The avatar may be selected from a preferred user in the adhoc group, or rotated. The typeahead may use the adhoc group to associate users when the user types a name which exists in the adhoc group membership.

The adhoc groups generated by conjunction/intersection may last longer. Intersection shows a stronger social relationship with the user. When the same adhoc groups are generated, the groups may be shared. The adhoc groups with the same user set may be combined into one permanent group shared by each owner.

The methodology of the present disclosure in one embodiment may improve the end user's productivity in using social networking website or another application via which users communicate.

Social network refers to a network of people, in which nodes are people and the connections between the nodes represent the relationships between people. The capacity to social network is provided by a computer-implemented platform or service that allows people to communicate and interact, e.g., create or form one or more groups or communities and share information, e.g., content such as social media content (text, image, video, and others) generated by people. Social network applications usually operate over the Internet, e.g., utilizing World Wide Web (web) and web site technology. Social networking sites or websites are online places where users can sign up, create a profile for themselves, and socialize with others, e.g., using social media tools such as blogs, video, images, tagging, messaging and others. A profile of social network refers to the information a user provides to the social network application about the user when the user signs up for a social network website. A wall is a section in a user's profile or web page of social network site where others can write messages to the user. The wall may be a public writing space so others who view the user's profile can see what has been written on the user's wall. The user can also respond directly back to the friend who wrote on the wall.

The following illustrates an example of a use case scenario in one embodiment of the present disclosure. The user logs on to a social networking website. The user views different messages posted on her wall. The user notices that some people said "congratulations" and other people said "happy birthday!" The user selects a message using an input device. For example, the user holds down the mouse and draws a circle around a message that says "congratulations!" Another geometric shape may be used to select the message or portion of the content of the message. While drawing of a circle is used in the below scenario, it should be understood that any other geometric shape or selection indication may be utilized. Referring to the use case scenario example, a user interface of the present disclosure shows the circle, e.g., highlighted on the user interface. Responsive to receiving the user selection, a computer-implemented process automatically retrieves author's profile information from this group of people who posted similar messages as the selected message.

The user may select another message using an input device. For example, the user holds down the mouse again and draws another circle onto the message saying "happy birthday!" The second circle is shown, e.g., highlighted on the user interface. The computer-implemented process automatically retrieves author's profile information from the second group of people who posted similar messages as the selected message.

The user may drag the first circle on top of the second circle. The computer-implemented process automatically creates a union of the two groups of people. The user drags the first circle and places the edge of the first circle on top of the edge of the second circle. The user can determine how much overlapping the user wants to have among groups, for example, as described in more detail below. The computer-implemented process automatically creates an intersection of the two groups of people. The same action can be performed on other groups as needed when the user want to create more complex adhoc groups. For example, upon selection of the first message, the computer-implemented process or system extracts the referenced users, e.g., those who are listed in 'to', 'cc', 'bcc' header fields, authors, or readers. When the second message is selected, the computer-implemented process or system extracts the second set of referenced users. The computer-implemented process or system compares the two lists such that the intersection of the two lists—elements in both lists—are kept. For example, consider an example in which User B and User E are in the first set; User S and User E are in the second set. The computer-implemented process or system checks the second set to determine if User B and User E each exist. As User E is the only member of each one, the intersection group is now the set of User E.

Once the adhoc group creation is finished, the user can type in a "Thank You" message, e.g., in the Status Update message box. The user can decide to submit this message to the newly created group.

In one aspect, a user interface of the present disclosure may display a percentage scale labeled on a circle the user is dragging and dropping onto another circle. For example, as the user moves the circle onto another circle, the percentage indication of the amount of intersection between the two circles may appear on the user interface. If the user wants to create a 20% of intersected members between these two groups, the user moves the edge of the first circle and ensures the 20% label is on top of the second circle. This implies that the user wants to have 20% of the matched users that posted similar comments to be created within one group. If the user chooses 80% scale then analyzing which team members should be placed in the same group may be less strict.

For example, consider two list of users: first list includes User A, User B, User C, User D, User E, User F, User G, and User H; second list includes User A, User B, User C, User J, User K, User L and User M. The computer-implemented process or system identifies that intersecting members of the two lists include User A, User B and User C. As an example, if a user via an input device indicates 33% (to create a group comprising 33% of the intersected members), the computer-implemented process or system detects the 33% indication, and determines that a corresponding adhoc group would be Group A (including User A), Group B (including User B), Group C (including User C). That is one or more groups are created that include 33% of the intersecting members. As another example, if a user indicates 66% (e.g., by dragging and dropping one list into another list, and stopping at 66% overlap label), the computer-implemented process or system determines that a corresponding adhoc group would be Group A (including User A and User B), Group B (including User A and User C), Group C (including User B and User C). That is one or more groups are created that includes 66% of the intersecting members.

The user can take advantage of thread view feature provided in social network applications. Threads, for example, are strands of conversation. In some applications, threads may be defined by messages that use the use the same subject. The user can hold down the mouse and draw a circle onto a threaded message and create an ad hoc group from the people contributed comments to that thread. The user can respond to this ad hoc group with one message.

In another aspect, when the user sends out the "Thank You" message to the group, the message can also append each person's name from this ad hoc group to it to make the message more individualized. For example, the message can look like: Thank you, Susan, Lisa, Sarah, Brian and Todd!

The methodology of the present disclosure can be applied to web conference or phone conference message broadcasting, for instance, in addition to social networking. For example, one or more adhoc groups that may be created according to a methodology of the present disclosure may be reused to create a web conference or phone call. The methodology may help a user from performing redundant tasks.

FIG. 1 is a flow diagram illustrating a method of the present disclosure in one embodiment. The method for example identifies recipients to receive communication based on content selection. At 102, an indication of content that is selected by a user is received. In one embodiment, the content is part of communication messages communicated among users, e.g., to the user from a plurality of other user, e.g., part of group communication that is communicated among users via an online communication application. Examples of content include, but are not limited to, a post, repost, message, text, picture, video, file, or comment, or combinations thereof. Examples of online communication application may include social network application, an electronic mail system, a short message service, an instant message service, or combinations thereof.

For example, the user and the plurality of other users may be registered users of a service or application such as a social network application that allows the user and the plurality of other users to communicate, e.g., online. The indication may be a user selecting the content, for example, using an input device by drawing a shape around the content. An example of a shape is a circle. A user interface of the present disclosure in one embodiment may detect such indication that is input using an input device.

Figure 2:
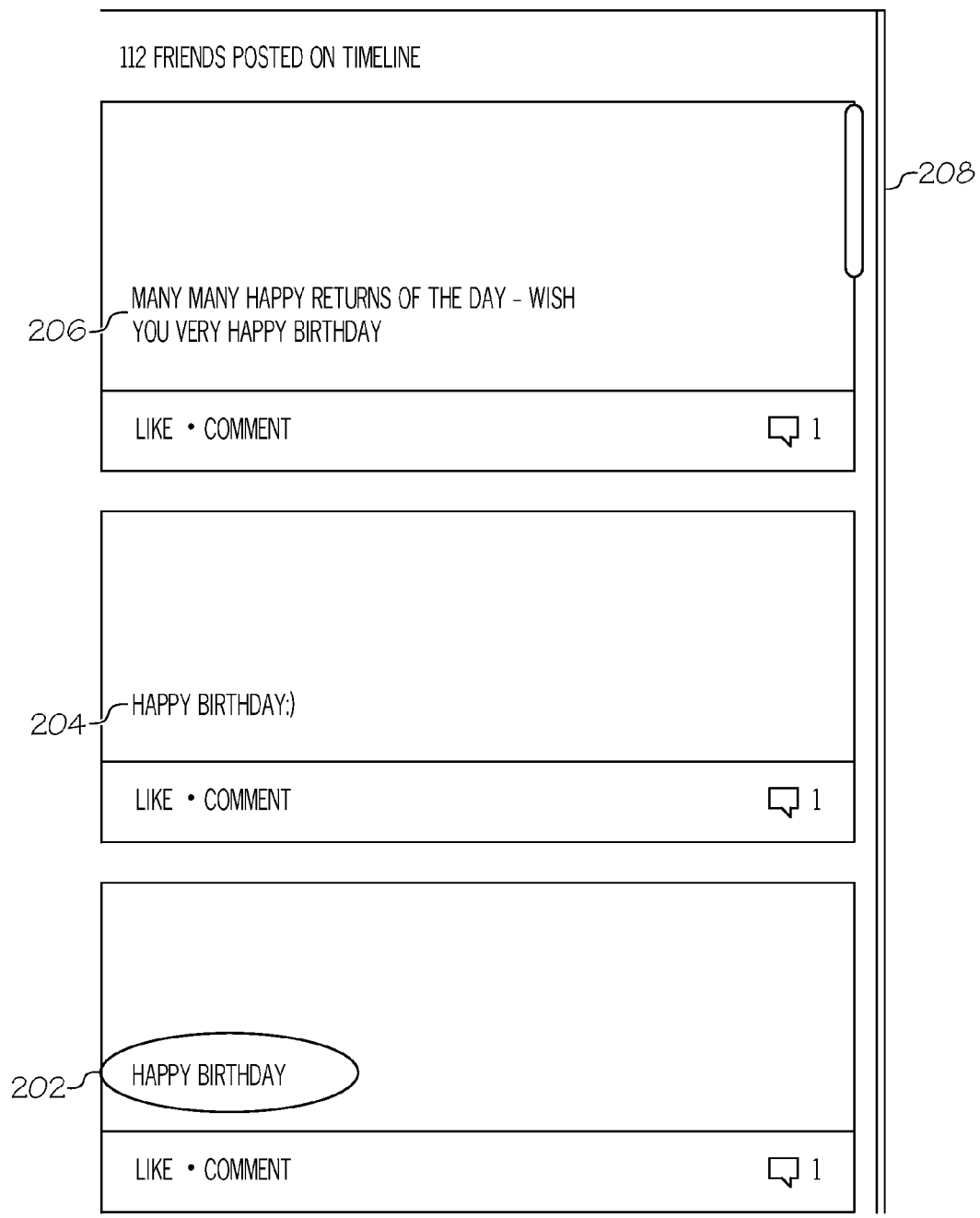
FIG. 2 shows an example of group communication in which a user has selected content in one embodiment of the present disclosure.

FIG. 2 shows an example of group communication in which a user has selected content in one embodiment of the present disclosure. This example shows messages 202, 204, 206 as content posted on a social network wall of a user. The wall is part of a user interface that displays the content such as messages and allows the user to input data, e.g., more messages. The user interface in one embodiment of the present disclosure may also allow the user to select content, for example, draw a geometric shape around the content, or another gesture to select the content, using an input device. The user interface detects the selection.

Referring to FIG. 1, at 104, the content is identified and the author of the content is also identified. Other attributes associated with the content may be also identified. For example, the user interface may detect the selection and selected content. The user interface or another process may analyze the content using a natural language processing technique to parse the content. The parsed content may be used to determine other content in the group communication related to the content that is selected, e.g., those that are similar. The author of the content may be identified based on the information stored by the service or application that provides the group communication facility. An example of such service or application is a social network application.

At 106, based on one or more criteria associated with the content, the recipients are identified. For example, one or more criteria is applied to the content to determine the recipients of the communication. The user may have a control over which criteria to use. For instance, the user interface may allow the user to enter to select one or more criteria. An example of criteria may include other users providing comment related to the content. Those other users providing comment related to the content in the group communication may be identified and determined as the recipients. Another example of criteria may be other content in the group communication that is similar to the selected content.

As an example, similarity of contents may be determined based on techniques such as natural language processing technique that may parse the content into tokens and compare the number of tokens in common. Based on commonality (e.g., the number of tokens in common) between the contents, similarity may be determined. For example, if there is commonality that meets a defined similarity threshold level, the contents may be considered to be similar. The authors of those content determined to be similar to the selected content may be identified as the recipients.

Other examples of criteria may include one or more rule-based criteria that considers one or more factors associated with time, social network affinity to the user, one or more attributes associated with the content, or one or more attributes associated with the users (e.g., a user who identifies to be interested in the subject matter of the content), or combinations thereof.

As described above with reference to an example use case scenario, the user interface or the like functionality in one embodiment of the present disclosure may allow the user to combine a plurality of content, for example, by dragging and dropping one selected content over another selected content. The authors of the overlapping content are identified and determined as the recipients. For example, the user interface or another computer-implemented functionality may identify the first artifact or content, and extract the authors and/or users of the first artifact. The user interface or another computer-implemented functionality may detect dropping of the first artifact on a target drop area of the second artifact, and extract the authors and/or users of the second artifact. The user interface or another functionality may evaluate the sets of authors/users for intersections.

At 108, a reply message or communication may be sent or transmitted to the determined recipients. For example, a single message or communication may be sent that replies or comments on the content to the determined recipients simultaneously. An example of sending or transmitting the communication is responsive to the user entering the communication, posting the communication on a social network website page or wall.

In one embodiment of the present disclosure, the determined recipients may be saved or used as a group. Hence the methodology of the present disclosure in one embodiment creates an adhoc group based on content and one or more criteria.

Figure 3:
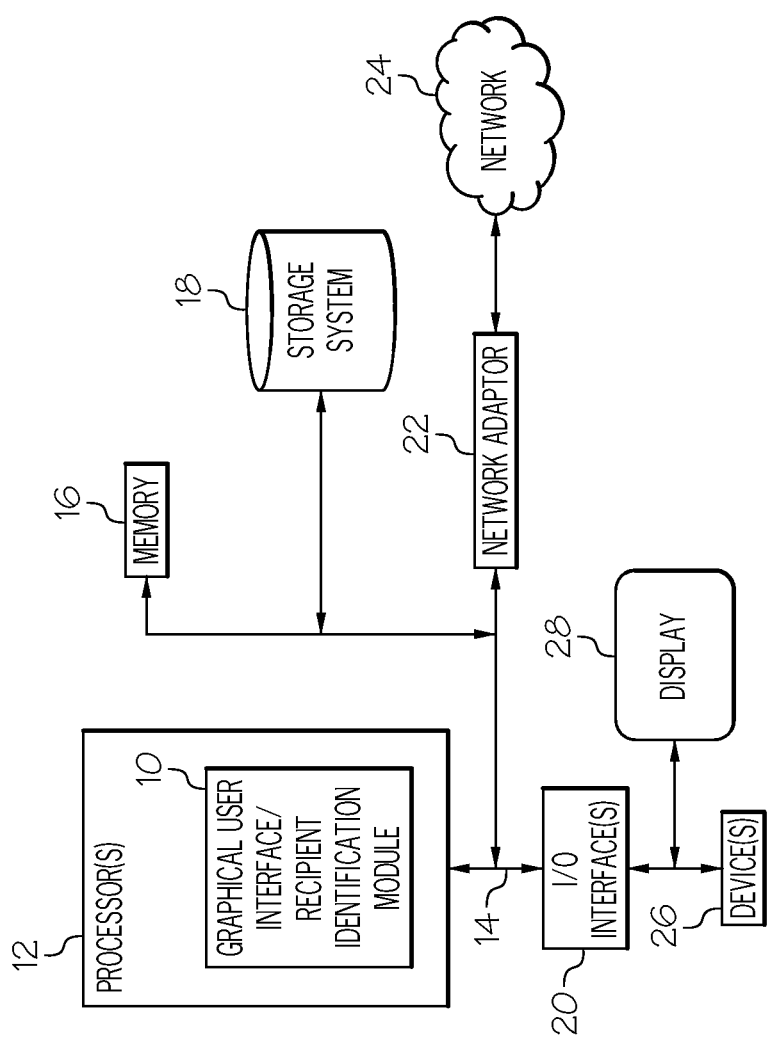
FIG. 3 illustrates a schematic of an example computer or processing system that may implement a recipient identification system in one embodiment of the present disclosure.

FIG. 3 illustrates a schematic of an example computer or processing system that may implement a recipient identification system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 3 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method of identifying recipients to receive a new communication based on content selection, the method performed by at least one hardware processor, the method comprising:
   receiving an indication of content selected by a user, the content being part of group communication posted on a social network web page wall that is communicated among users via an online communication application;
   identifying the content and an author of the content;
   applying one or more criteria to the content to determine the recipients of the new communication;
   transmitting the new communication as a single message to the recipients simultaneously; and
   allowing the user to select the content among a plurality of messages posted by different users,
   draw on a user interface a geometric shape around the content to indicate the selected content, and
   drag and drop the geometric shape onto another geometric shape around another content to form an adhoc group of recipients that include a percentage of intersecting recipients of the content and said another content, the percentage indicated by amount of overlapping of the geometric shape and said another geometric shape, and wherein a percentage scale is displayed as a label on the geometric shape the user is dragging and dropping onto said another geometric shape on the user interface.

2. The method of claim 1, wherein the criteria comprises other users providing comment related to the content, wherein the applying one or more criteria comprises identifying said other users providing comment related to the content in the group communication, wherein the author and said other users are identified as the recipients.

3. The method of claim 1, wherein the one or more criteria comprises other content determined to be similar to the content according to a similarity threshold, wherein the author of the content and authors of the other content are identified as the recipients.

4. The method of claim 1, wherein the one or more criteria is rule-based defined according to one or more factors associated with time, social network affinity to the user, one or more attributes associated with the content, or one or more attributes associated with the users, or combinations thereof.

5. The method of claim 1, wherein the content comprises a post, repost, message, text, picture, video, file, or comment, or combinations thereof.

6. The method of claim 1, wherein the online communication application comprises social network application, an electronic mail system, a short message service, an instant message service, or combinations thereof.

7. The method of claim 1, further comprising:
   providing the user interface that allows the user to select the content; and
   responsive to the user utilizing the user interface, allowing the user to control the criteria.

8. The method of claim 7, wherein the user interface further allows the user to combine a plurality of content comprising the content, wherein the recipients are determined based on the combined plurality of content.

* * * * *